United States Patent [19]

Palmer

[11] 4,075,790
[45] Feb. 28, 1978

[54] SCREW THREAD TAP GRINDING WITH AUTOMATIC LOADING MEANS

[75] Inventor: Raymond Leslie Palmer, Solihull, England

[73] Assignee: Coventry Gauge & Tool Company Limited, England

[21] Appl. No.: 744,272

[22] Filed: Nov. 23, 1976

Related U.S. Application Data

[60] Division of Ser. No. 577,424, May 14, 1975, Pat. No. 3,994,099, which is a continuation of Ser. No. 349,623, April 9, 1973, abandoned.

[30] Foreign Application Priority Data

May 6, 1972 United Kingdom ............... 21227/72

[51] Int. Cl.² ................................................ B24B 3/18
[52] U.S. Cl. .................................. 51/94 CS; 51/215 H
[58] Field of Search .................. 51/94 R, 94 C, 97 R, 51/97 C, 234, 215 H, 215 CP

[56] References Cited

U.S. PATENT DOCUMENTS

| | | | |
|---|---|---|---|
| 1,709,617 | 4/1929 | Hanson | 51/97 NC |
| 2,060,438 | 11/1936 | Harley | 51/94 C |
| 2,388,064 | 10/1945 | Markus | 51/94 C |
| 2,692,535 | 10/1954 | Praeg | 51/215 H |
| 3,110,132 | 11/1963 | Bassoff | 51/215 H |
| 3,665,656 | 5/1972 | Newsome | 51/215 H |
| 3,863,402 | 2/1975 | Price | 51/215 H |

Primary Examiner—Harold D. Whitehead
Assistant Examiner—Nicholas P. Godici
Attorney, Agent, or Firm—Watson, Cole, Grindle & Watson

[57] ABSTRACT

Tap grinding apparatus is provided consisting firstly of a support or cradle mountable in a grinding machine in relation to a thread grinding wheel of the latter for relative traverse of said support and grinding wheel, the support having headstock and tailstock centers for rotatably receiving a tap workpiece whereby the latter is mounted in relation to a said grinding wheel, at least one of said centers being operable for axial retraction relative to the other for obtaining release and discharge of a ground tap workpiece from between the centers. Secondly automatic loading means is provided consisting of a magazine for receiving uniformly arranged tap workpieces to be ground for sliding feed movement there-along to a lifter member, a transfer holder being provided having a spring latch for receiving and holding a tap workpiece raised therein by the lifter member. The transfer holder is operable for operative movement and return in order to position and release the tap workpiece to be ground between the centers for holding thereby on relative axial return movement of the centers, the spring latch riding over the workpiece between the centers on the return movement of the transfer holder.

1 Claim, 4 Drawing Figures

SCREW THREAD TAP GRINDING WITH AUTOMATIC LOADING MEANS

This application is a divisional application of application Ser. No. 577,424 filed on May 14, 1975, now U.S. Pat. No. 3,994,099, which in turn was a continuation application of application Ser. No. 349,623 filed on Apr. 9, 1973, now abandoned.

This invention relates to screw thread tap grinding apparatus and has for its object to provide such apparatus incorporating means for automatically loading tap workpieces to be ground into the apparatus.

In practice the construction of the apparatus is as follows, reference being had to the accompanying drawings in which:

FIG. 3 is a sectional end view taken in the direction of the arrow III of FIG. 2.

Figure 1:
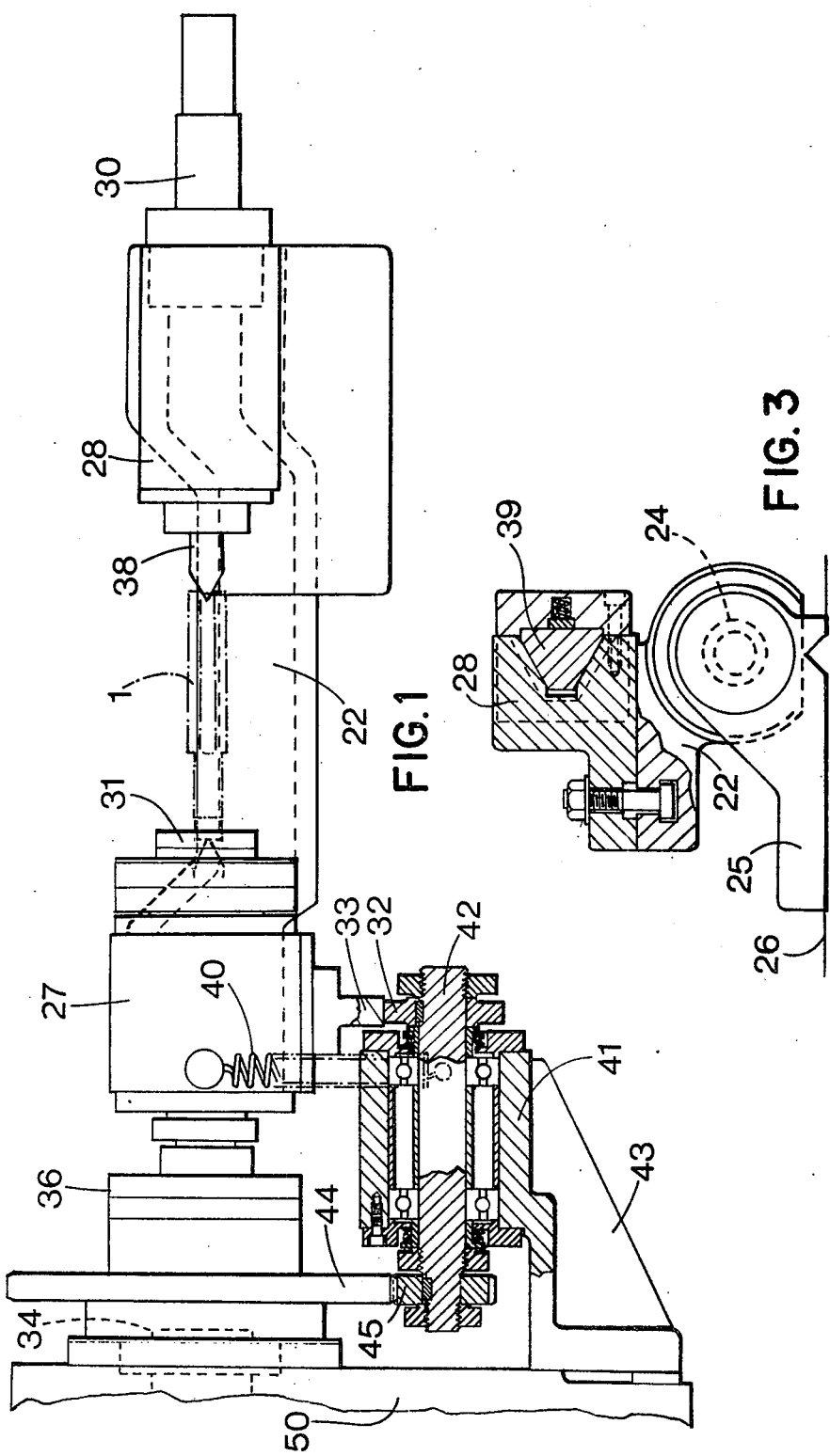
FIGS. 1 and 2 are a plan view and sectional elevation respectively of the tap grinding apparatus.
Figure 2:
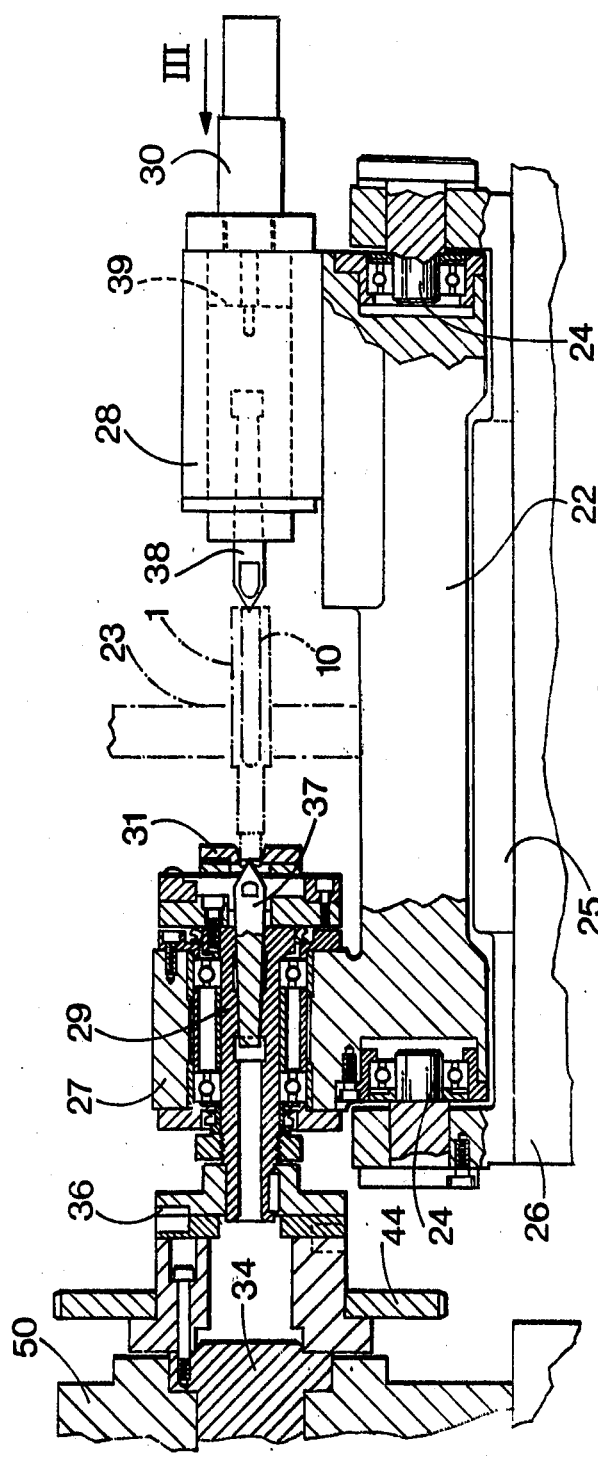

In a thread grinding machine or as an attachment therfor a support shown in the form of a cradle 22 is arranged to support a tap workpiece or tap blank 1 for driven rotation in relation to a large diameter thread grinding wheel 23 of the machine, the latter having provision for axial traverse of the tap 1 relative to the wheel 23 in the usual manner and in accordance with the pitch of the required thread form of the tap 1.

The support or cradle 22 is arranged for lateral oscillation by cam mechanism hereinafter described whereby corresponding oscillation is imparted to the tap 1 in timed relationship with its rotation such that appropriate relief is imparted to the ground thread form of the tap.

For this purpose the cradle 22 is shown pivotally mounted at 24 on suitable base support structure 25 on the machine table 26 or the cradle 22 can be similarly mounted for such oscillation or deflection such as by spring means or by thin section connection with the base structure 25.

The support or cradle 22 is provided with a head stock 27 and tail stock 28 for supporting a tap workpiece 1 between work centres 37, 38 the head stock 27 carrying a driving spindle 29 which in turn carries a work driver 31. In order to oscillate the cradle 22 a cam 32 is shown carried by a layshaft 42 and co-operates with a follower 33 on the head stock 27, the layshaft 42 being journalled in bearing housing 41 of a bracket 43 fixedly mounted from the machine head stock 50 so as to be fixed in relation to the base structure 25. The layshaft 42 is driven by a gear drive 44, 45 from the machine driving shaft 34.

The arrangement enables a single lobe cam to be employed at 32 with appropriate step up ratio gearing at 44, 45 according to the number of thread land 10 of the tap 1. Thus in the case of a tap 1, the gear ratio at 44, 45 is 3 : 1.

The form of the single lobe cam 32 and its cooperation with the follower 33 is such that it imparts lateral oscillation to the cradle 22 about the pivotal mounting 24 and in relation to rotation of the tap 1 carried thereby and also in relation to the lands 10 of the latter such that required relief is ground on the thread form of each land 10 of the tap 1. Formation of the single lobe profile of the cam 32 for this purpose can thus directly correspond to the relief required on the tap thread form on each land 10 of the tap 1 and may be of the order of 0.005 inch (0.125mm).

In order to maintain constant contact of the cam 32 with the follower 33, spring loading is shown provided in the form of a tension spring 40 anchored between the cradle head stock 27 and the bracket 43.

Having regard to the oscillation of the cradle 22, a drive connection to the headstock spindle 29 is effected from a driving shaft 34 of the machine via a coupling 36 of known floating center or other suitable form (e.g. an Oldham coupling) for permitting lateral mis-alignment of the headstock spindle 29 and machine shaft 34 yet effecting continuous rotation of the spindle 29.

Whereas it has been the practice in the past to effect variation or oscillation of the feed of the grinding wheel 23 relative to the tap workpiece or tap blank 1 for the purpose of effecting thread form relief, the present arrangement has the advantage that the small mass of the tap 1 and cradle 22 compared with that of a large diameter grinding wheel 23 enables rapid lateral oscillation of the tap 1 to be effected and so permit higher speeds of rotation of the wheel 23 and tap 1 with resulting higher production rates. Thus the speed of rotation of the tap 1 may be of the order of 1,000 r.p.m. or more with a relative surface speed of the grinding wheel 23 and tap 1 being of the order of 16 to 20 meters per second (50 to 65 feet per second). However, it is emphasised that these and any other figures or values quoted herein are given by way of example only and may be varied according to requirements.

Also in the interests of rapid production, provision is included for automatic loading and unloading of taps 1 into and from the cradle 22 which can be effected during dead time i.e. after completion of axial traverse of a ground tap 1 relative to the grinding wheel 23.

Thus after grinding, a tap 1 is released from between the centres 37, 38 for discharge and collection via a chute, guideway or conveyor (not shown).

For this purpose the centres 37, 38 are opened e.g. by axial retraction of the tail stock centre slide as at 39 by a hydraulic cylinder 30 on the tail stock 28, and during such dead time or pause, a fresh tap blank 1 is fed between the centres and held by the latter on return movement of the tail stock centre 38.

Figure 4:
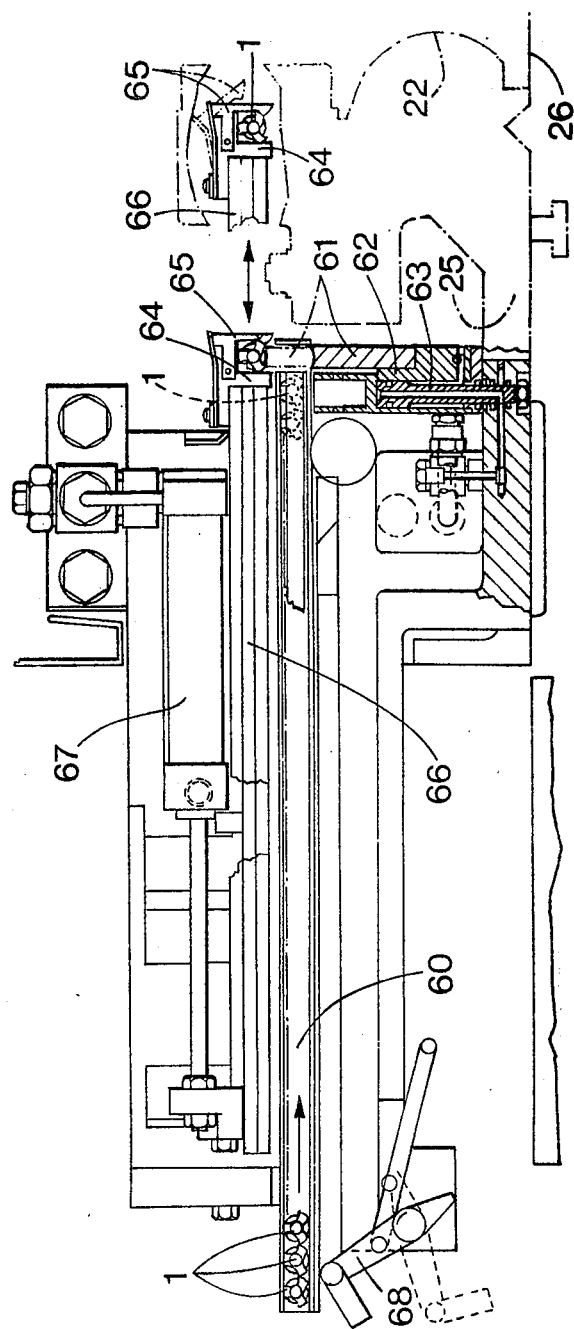
FIG. 4 is an elevational of the tap workpiece loading means.

Tap blanks to be ground are individually fed from a horizontal magazine 60 of loading means (FIG. 4) in which tap blanks 1 are held side by side in a magazine 60 for sideways feed movement along the latter.

A tap blank 1 issuing from the forward end of the magazine 60 is received on a vertical lifter 61 operated by hydraulic ram means 62, 63 in which the cylinder 62 carrying the lifter 61 is operable for vertical movement relative to a fixed piston 63. Operation of the lifter 61 in this way introduces the tap blank 1 into a transfer holder 64 having a spring retaining latch 65.

The transfer holder 64 is carried by a carriage or slide 66 arranged for ram operation at 67 in a forward operative direction in order to position the tap blank 1 in the transfer holder 64 between the centres 37, 38 of the cradle 22. On closing of the centres to hold the tap blank 1 and on return movement of the carriage 66 and holder 64, the spring latch 65 yields to ride over the tap blank 1 now held between the centres 37, 38.

As will be appreciated the hydraulic ram means 62, 63 and 67 operate in timed relationship with one another and with operation of the work table traverse of the tap grinding machine. The magazine 60 may be inclined or actuated as at 68 to ensure issuance of a tap blank 1 for each operation of the lifter 61 and transfer holder 64.

The cradle 22 can thus receive a fresh tap blank 1 prior to each return traverse and in readiness for an operative grinding traverse so that high speed tap grinding can proceed in a continuous and automatic manner.

I claim:

1. Screw thread tap grinding apparatus comprising a support mountable in a grinding machine in relation to a thread grinding wheel of the latter for relative transverse of said support and grinding wheel, the support carrying headstock and tailstock means for rotatably receiving a tap workpiece between a centre of a driving centre spindle of the headstock and a centre of the tailstock whereby a said tap workpiece received therebetween is mounted in relation to a said grinding wheel for grinding thereby; operating means for effecting axial retraction of at least one of said centres relative to the other for obtaining release and discharge of a ground tap workpiece from between said headstock spindle centre and tailstock centre; a magazine for receiving uniformly arranged tap workpieces to be ground for sideways sliding feed movement therealong and axially parallel with the axis of said centres; a lifter member for receiving a tap workpiece directly thereon as it issues from the magazine and operable for raising a said tap workpiece supported thereby, a transfer holder having a spring latch for receiving and holding a said tap workpiece raised therein by the lifter member, said transfer holder being operable for operative movement in order to position a said tap workpiece to be ground between said centres for holding thereby on relative axial return movement of the centres, the spring latch being yieldable so as to ride over the said tap workpiece when the latter is held between the centres in order to permit empty return movement of the transfer holder.

* * * * *